Sept. 3, 1940.  G. KATZ  2,213,915
RUBBISH RECEPTACLE
Original Filed March 6, 1939
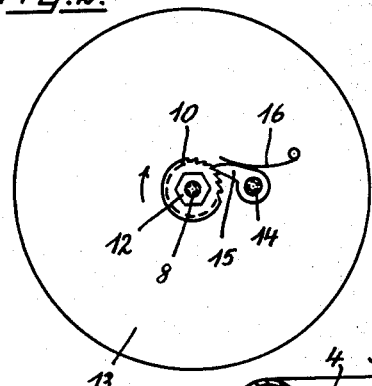
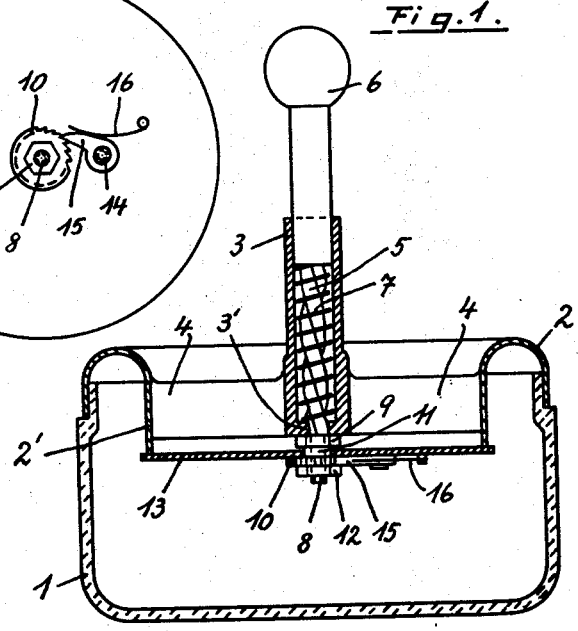
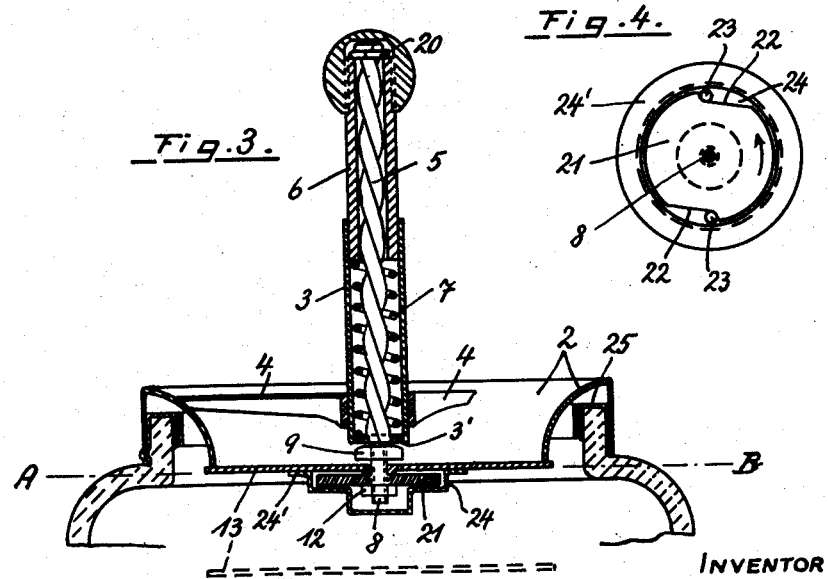
INVENTOR.
GEORG KATZ.
ATTORNEY.

Patented Sept. 3, 1940

2,213,915

UNITED STATES PATENT OFFICE 2,213,915

RUBBISH RECEPTACLE

Georg Katz, Stuttgart-Feuerbach, Germany

Application March 6, 1939, Serial No. 260,232.
Renewed June 14, 1940. In Germany April 8,
1938

3 Claims. (Cl. 220—20.5)

The invention relates to receptacles or bins for rubbish, for example for ashes.

It has been proposed heretofore to provide a rubbish or ash bin with a chute at the top, normally closed at its lower end by a conical cover fixed to a screw with a thread of coarse pitch engaged with a fixed nut supported centrally in the chute, so that by depressing the screw, against the action of a spring, the cover is lowered into the bin and at the same time caused to rotate, so as to fling off the rubbish tipped on to it.

According to my invention the cover, preferably flat instead of coned, is not rigidly fixed to the screw, but is engaged therewith by means of a free wheel clutch so that it can continue to rotate by its own momentum when the screw has been fully depressed. This has the advantage of ensuring that the cover will be effectively cleared, even if it is flat, and a flat cover has over a coned cover the advantage of reducing the height of the structure.

Two embodiments of the invention are shown by way of example in the accompanying drawing, in which:

Fig. 1 is a vertical section of the receptacle, in one form of construction, and Fig. 2 a bottom plan view of the cover thereof;

Fig. 3 is a vertical section showing the second form of construction, with the lower part broken away, and Fig. 4 is a section of the line A—B of Fig. 3, with the wall of the receptacle omitted.

Referring first to Fig. 1, the body 1 of the receptacle has fitted thereto at the rim a ring 2 of arched cross-section with a downwardly extending part 2¹ forming a short chute. A vertical tube 3 is supported by radial arms 4 within this chute, and within this tube there is a screw 5 with a thread of very coarse pitch, and the screw has a handle 6 projecting from the top of the tube. A coiled spring 7 in the tube urges the screw upwards. The screw engages a nut formed by a screw threaded flange 3¹ at the bottom of the tube 3, and has at its lower end an extension 8 with a screw thread of finer pitch, on to which a nut 9 is screwed, limiting the upward movement of the screw.

Below the nut 9 a ratchet wheel 10 with an annular boss 11 at its eye is fixed upon the part 8 by a nut 12, and the cover 13 of the receptacle, which has a central hole for the boss 11, rests on the wheel 10. On the under side of the cover 13 there is a pivot 14 for a pawl 15, which is held in engagement with the ratchet wheel by a spring 16.

The spring 7 normally holds the nut 9 against the flange at the bottom of the tube 3, and the cover 13 is then held tightly against the rim of the chute 2¹.

When ash or other rubbish has been tipped into the chute and rests on the cover 13 the handle 6 is rapidly depressed, causing the cover to be lowered into the receptacle. During its downward movement with the handle the screw 7 rotates rapidly, by reason of its engagement with the screw threaded flange 3¹, and the ratchet wheel 10, acting on the cover 13 by means of the pawl 15, causes the cover to rotate, as indicated by the arrow in Fig. 2. The momentum imparted to the cover causes it to continue to spin round for some time after the downward thrust and the rotation of the wheel 10 have stopped, and the rubbish is flung off the cover by centrifugal force.

In the embodiment shown in Figs. 3 and 4 the handle 6 is not fixed to the screw 5, and can consequently be depressed without rotating with the screw. The handle is hollow, and the screw extends into it and has thereon at the top a ring 20 which rests on the shank of the handle, within a hollow knob screwed to the shank.

The flange 3¹ is in this case a flat ring fixed inside the tube 3 at its lower end.

The nut 12 on the extension 8 of the screw 5 supports a disk 21 having at its rim recesses 22, into which engage balls 23 held by a housing 24 having a flange 24¹ fixed to the under side of the cover 13, so that the disk, balls and housing constitute a free wheel clutch for rotating the cover. This clutch has over the ratchet clutch the advantage of being noiseless.

The container 26, which may for example be of earthenware, has a metal ring 25 of inverted U-section cemented to its rim, and the chute ring 2 is fixed to this ring 25 by means of a screw or bayonet joint, so that the chute with the cover 13 can be removed from the receptacle if desired.

What I claim as my invention and desire to secure by Letters Patent of the United States is:

1. A rubbish receptacle comprising in combination a container, a chute in the mouth of said container, a nut and a support whereby said nut is centrally supported in said chute, a vertical screw spindle of coarse pitch engaged with said nut, a cover carried by said spindle and rotatable thereon, a spring urging said spindle upwards, whereby said cover is caused normally to close said chute at its lower end, and a free wheel clutch whereby said cover is engaged with said spindle so that said cover is rotated by the rotation of said spindle due to downward movement thereof through said nut.

2. A rubbish receptacle comprising in combination a container, a chute in the mouth of said container, a nut and a support whereby said nut is centrally supported in said chute, a vertical screw spindle of coarse pitch engaged with said nut, a flat cover carried by said spindle and rotatable thereon, a spring urging said spindle upwards, whereby said cover is caused normally to close said chute at its lower end, and a free wheel clutch whereby said cover is engaged with said spindle so that said cover is rotated by the rotation of said spindle due to downward movement thereof through said nut.

3. A rubbish receptacle comprising in combination a container, a chute in the mouth of said container, a nut and a support whereby said nut is centrally supported in said chute, a vertical screw spindle of coarse pitch engaged with said nut, a cover carried by said spindle and rotatable thereon, a spring urging said spindle upwards, whereby said cover is caused normally to close said chute at its lower end, and a free wheel clutch under said cover whereby said cover is engaged with said spindle so that said cover is rotated by the rotation of said spindle due to downward movement thereof through said nut.

GEORG KATZ.